United States Patent [19]

Ceste, Sr.

[11] Patent Number: 4,812,625
[45] Date of Patent: Mar. 14, 1989

[54] TEMPERATURE CONTROL SYSTEM FOR COOKING APPARATUS

[75] Inventor: Mario G. Ceste, Sr., Stratford, Conn.

[73] Assignee: Food Automation-Service Techniques, Inc., Stratford, Conn.

[21] Appl. No.: 103,448

[22] Filed: Sep. 30, 1987

[51] Int. Cl.[4] ............................................. H05B 1/02
[52] U.S. Cl. ......................... 219/497; 219/506; 219/492; 219/508; 219/442; 340/825.06; 340/588; 99/330; 99/328
[58] Field of Search .................. 219/440–442, 219/492, 493, 497, 499, 501, 506, 508, 509; 340/588, 589, 870.21, 825.06; 99/328, 330, 331–333

[56] References Cited

U.S. PATENT DOCUMENTS

| | | |
|---|---|---|
| 4,278,872 | 7/1981 | Koether et al. ............... 219/497 |
| 4,282,423 | 8/1981 | Volz ............................... 219/497 |
| 4,585,925 | 4/1986 | Andre ............................ 219/497 |
| 4,626,662 | 12/1986 | Woolf ........................... 219/442 |
| 4,636,949 | 1/1987 | Longabaugh .................. 219/442 |

Primary Examiner—M. H. Paschall
Attorney, Agent, or Firm—Felfe & Lynch

[57] ABSTRACT

A temperature control system for cooking apparatus, for example, a fryer using cooking oil or shortening which is heated by a suitable heating element. The cooking apparatus has different modes of operation including start-up mode, idle mode and cooking mode. Overshoot to a temperature above the setpoint temperature is limited during start-up mode, idle mode and cooking mode with the apparatus having different temperature control characteristics based on the mode of operation and adapting variable parameters to achieve optimum temperature control accuracy.

13 Claims, 6 Drawing Sheets

STATUS FLAGS

| RESULT | RISE | FALL | FAST | SLOW |
|---|---|---|---|---|
| No Change | 0 | 0 | 0 | 0 |
| +1° | 1 | 0 | 0 | 1 |
| +2° | 1 | 0 | 1 | 0 |
| -1° | 0 | 1 | 0 | 1 |
| -2° | 0 | 1 | 1 | 0 |

TEMPERATURE CONTROL SYSTEM FOR COOKING APPARATUS

This invention relates to a temperature control system for cooking apparatus and, more particularly, to a temperature control system for cooking apparatus of the type using a cooking medium, for example, a fryer using cooking oil or shortening which is heated by a suitable heating means. The cooking apparatus may have different modes of operation, for example, start-up mode, idle mode and cooking mode.

While it may be desirable for the temperature of the cooking medium in the cooking apparatus to be maintained precisely at a desired cooking temperature, or setpoint temperature, when the cooking apparatus is first started, the cooking medium must rise in temperature from a relatively cold temperature to the cooking temperature. This initial phase is referred to as start-up mode of the cooking apparatus.

Cooking apparatus ordinarily heats the cooking medium to a temperature above the setpoint temperature during the start-up mode and enters a condition known as overshoot. Ordinarily the overshoot in cooking apparatus has been the greatest during the start-up mode or first cycle.

In an attempt to prevent large overshoot during start-up mode, prior temperature control systems have cycled the heat on and off intermittently on a time cycle basis prior to the cooking medium reaching the setpoint temperature. This switching the heat on and off is known as proportioning. In order to achieve minimum overshoot during start-up mode, the proportioning is activated at a temperature well below the setpoint temperature. The temperature range below the setpoint temperature during which the cycling occurs is known as the proportioning band.

Heretofore, proportioning bands which limit overshoot also have slowed the heating of the apparatus in start-up mode. Some prior proportioning control methods have also undesirably affected the heating of the apparatus during cooking mode. During cooking mode as product is introduced into the apparatus, it is desirable to add heat as quickly as possible to keep the temperature of the cooking medium from dropping to a low temperature rapidly.

Anetsberger et al U.S. Pat. No. 3,894,483 attempts to minimize the temperature drop of the cooking medium during cooking when the product is introduced by switching the heat source on whenever a cooking cycle is initiated. However, the heat is activated regardless of the actual temperature of the cooking medium and for a fixed period of time regardless of the cooking conditions. This results in overshoot if the load is insufficient to cause a temperature drop or if the temperature is already above the setpoint temperature.

In some prior apparatus when the apparatus is not cooking but is an idling mode, once the cooking oil reaches the selected temperature, the heating means is turned off and remains off until the temperature of the cooking oil has coasted back to a temperature slightly below the selected temperature. When the cooking apparatus is idling, i.e. not being used for a cooking operation, continuous operation of the heating elements tends to cause the temperature of the cooking oil to overshoot the selected temperature. This prior art is described in Koether et al U.S. Pat. No. 4,278,872. Koether et al propose to maintain a steady temperature during idle mode by pulsing the heat source on and off. During a cooking mode, this pulsing is overridden into a full "on" mode. The heat source remains full "on" during cooking and conditions can occur where recovery to the setpoint temperature is achieved at almost the same instant the cooking cycle is completed. Thus, when the product is removed, the residual heat in the apparatus can cause the temperature of the cooking medium to be in an overshoot condition.

Other proportional band temperature controllers are known in which the controller produces an output signal in proportion to the difference between the controller's setpoint temperature and input temperature. Such controllers are pre-programmed as a part of time sequence. Once the control process is started, the various control methods are implemented intermittently on a time cycle basis. Such controllers are described in article by Wahl "How To Select The Right Controller," published in Wahl Temperature Instruments catalog, 1986-1987, by Wahl Instruments, Inc., Culver City, Calif. U.S. Pat. No. 4,636,949-Longabaugh describes a pre-programmed controller which implements various control programs on a predetermined time/temperature sequence.

It is an object of the present invention, therefore, to provide a new and improved temperature control system for cooking apparatus which avoids one or more of the disadvantages of prior such control systems.

It is another object of the invention to provide a new and improved temperature control system for cooking apparatus having different temperature control characteristics based upon the mode of operation of the cooking apparatus, i.e., start-up, idle, or cooking mode.

It is another object of the invention to provide a new and improved temperature control system for cooking apparatus capable of sensing the actual temperature change of a cooking medium occurring during a current start-up, idle, or cooking mode and adapting variable parameters to achieve optimum temperature control accuracy.

It is another object of the invention to provide a new and improved temperature control system for cooking apparatus capable of altering control parameters during start-up mode to minimize overshoot.

In accordance with the invention, a temperature control system for cooking apparatus having a cooking mode and a second mode of operation comprises means for heating a cooking medium and means for sensing the actual temperature of the cooking medium. The system includes means for determining whether the cooking apparatus is in a cooking mode. The apparatus also includes means responsive to the mode determining means and to the sensing means for using on/off control during at least a portion of the cooking mode if the cooking apparatus is in the cooking mode and for using proportional band control if the cooking apparatus is in a second mode.

Also, in accordance with the invention, a temperature control system for cooking apparatus having different modes of operation comprises means for heating a cooking medium and means for sensing the actual temperature of the cooking medium. The apparatus includes means for determining whether the apparatus is in a first or second mode of operation. The apparatus also includes means responsive to the mode-determining means for determining a first variable temperature parameter when the apparatus is in said first mode and for determining a second different variable temperature parameter when the apparatus is in the second mode.

Also in accordance with the invention, a control system for cooking apparatus having different modes of operation comprises means for heating a cooking medium and means for sensing the actual temperature of the cooking medium. The system also includes means for determining whether the apparatus is in a first mode and means responsive to the mode determining means for determining a normal temperature in the first mode. The system also includes means responsive to the sensing means for determining whether the actual temperature is above a predetermined normal temperature. The system also includes means responsive to the sensing means and to the means for determining whether the actual temperature is above the predetermined normal temperature for switching the heating means on when the actual temperature is not above the normal temperature in the first mode. The apparatus also includes means responsive to the means for determining whether the actual temperature is above the predetermined normal temperature for re-determining the normal temperature at a higher predetermined temperature when the actual temperature is above the normal temperature in the first mode.

Also in accordance with the invention, a temperature control system for cooking apparatus having different modes of operation comprises means for heating a cooking medium and means for sensing the actual temperature of the cooking medium. The system includes means for determining whether the cooking apparatus is in a given mode for determining a variable temperature parameter when the apparatus is in the given mode and means for determining a second variable temperature parameter when the apparatus is in the given mode.

Also in accordance with the invention, a temperature control system for cooking apparatus comprises means for heating a cooking medium. The system includes means for sensing the actual temperature of the cooking medium and means responsive to the sensing means for determining whether the actual temperature is above a predetermined normal temperature. The system also includes means responsive to the sensing means and to the means for determining whether the actual temperature is above a predetermined normal temperature for comparing the actual temperature sensed by the sensing means with a predetermined setpoint temperature when the actual temperature is above the predetermined normal temperature. The system also includes means responsive to the comparing means for switching the heating means on and off with different duty cycles varying in accordance with the difference between the setpoint temperature and the actual temperature.

Also in accordance with the invention, a temperature control system for cooking apparatus having different modes of operation including start-up, idle and cooking modes comprises means for heating a cooking medium and means for sensing the actual temperature of the cooking medium. The system also includes means for determining whether the apparatus is in start-up mode and means responsive to the start-up-mode-determining means for determining a normal temperature at a lower temperature in start-up mode than when in idle mode. The system also includes means responsive to the sensing means for determining whether the actual temperature is above a predetermined normal temperature. The system also includes means responsive to the sensing means and to the means for determining whether the actual temperature is above the predetermined normal temperature for comparing the actual temperature sensed by the sensing means with a predetermined setpoint temperature when the actual temperature is above the predetermined normal temperature when in idle mode. The system also includes means responsive to the sensing means and to the means for determining whether the actual temperature is above the predetermined normal temperature for switching the heat on when the actual temperature is not above the normal temperature in start-up mode. The system also includes means for re-determining the normal temperature at a higher predetermined temperature when the actual temperature is above the normal temperature in start-up mode. The system also includes means for switching the heating means on and off with different duty cycles varying in accordance with the difference between the setpoint temperature and the actual temperature.

For a better understanding of the present invention, together with other and further objects thereof, reference is made to the following description, taken in connection with the accompanying drawings, and its scope will be pointed out in the appended claims.

Referring now to the drawings.

Before referring to the drawings in detail, it will be understood that for purposes of clarity, the apparatus represented in block diagrams of FIGS. 2-5, inclusive, utilize, for example, an analog-to-digital converter and a microprocessor which includes such hardware as a central processing unit, program and random access memories, timing and control circuitry, input-output interface devices and other digital subsystems necessary to the operation of a central processing unit as is well understood by those skilled in the art. The microprocessor operates according to the corresponding computer program produced according to the corresponding flow chart represented in the drawings.

Figure 1:
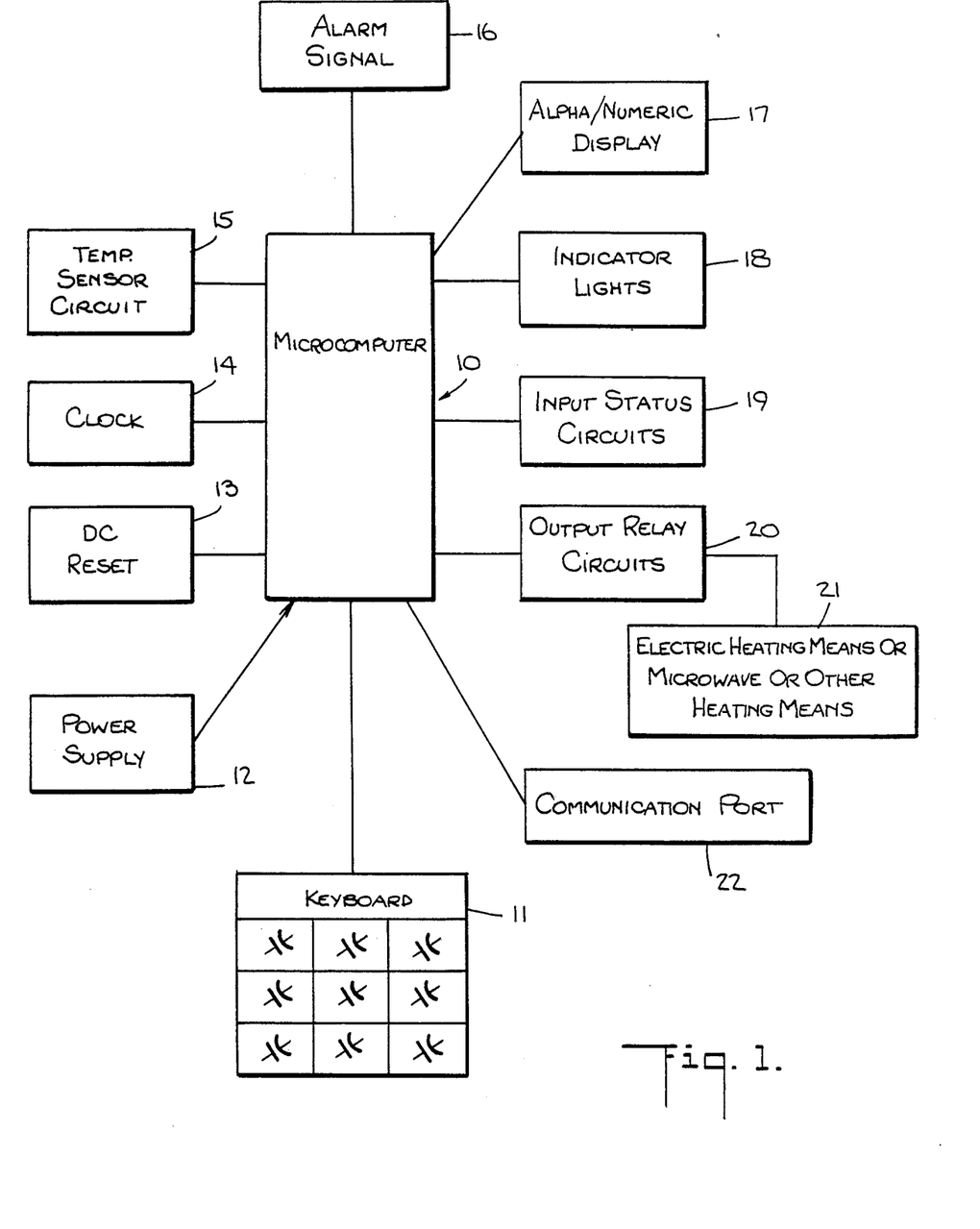
FIG. 1 is a schematic diagram representing cooking apparatus including a microcomputer usable in the temperature control system in accordance with the invention.

Referring now more particularly to FIG. 1 of the drawings, a microcomputer 10 includes a central processing unit which receives an input from a keyboard 11 which may, for example, comprise a capacitive keyboard.

The apparatus includes a conventional power supply 12, a reset circuit 13 for resetting the microcomputer when renewing power in the power supply, a clock oscillator 14 for providing clock pulses to the microcomputer 10, a temperature sensor circuit 15 for sensing the temperature within the cooking apparatus, an audible alarm 16, an alpha/numeric display 17 and indicator lights 18. The apparatus also includes an input status circuit 19 which may, for example, be responsive to a door switch (not shown) and to the open/close position of a drain valve (not shown). The microcomputer controls an output relay circuit 20 which may, for example, control the gas valves of a burner or a heating element or microwave or other heating means. The apparatus also includes a communication port 22 for transmitting signals to and from other apparatus.

The microcomputer 10 may, for example, be of a type used in apparatus described and claimed in copending application Ser. No. 840,362, filed Mar. 17, 1986, and in Ser. No. 943,949, filed Dec. 18, 1986, and in Ser. No. 937,988, filed Dec. 4, 1986 and in Ser. No. 934,700, filed Nov. 25, 1986 and in Ser. No. 911,480, filed Sept. 25, 1986 and in Serial No. 033,097, filed Mar. 31, 1987.

Figure 2:
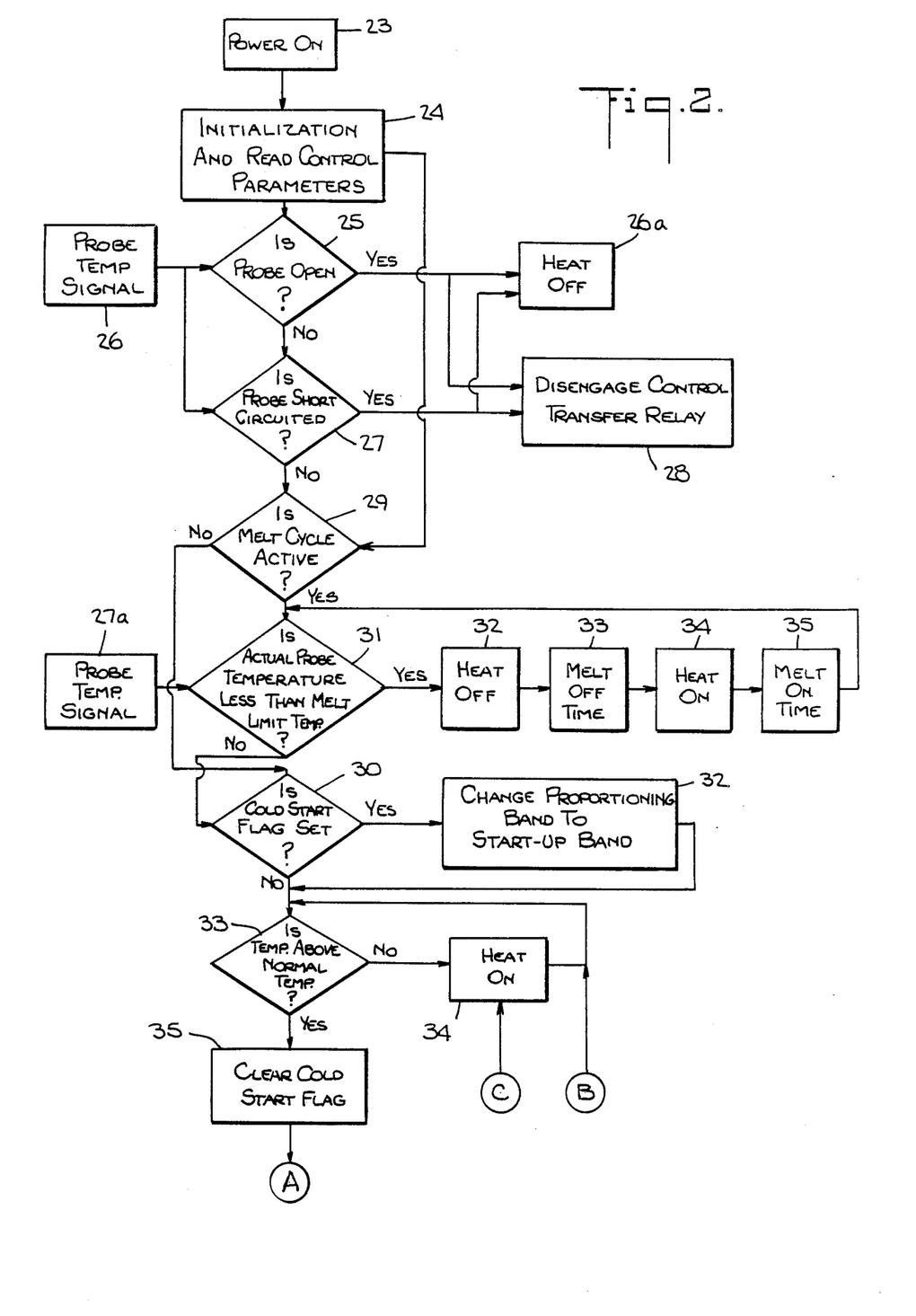
FIG. 2 is a flow chart comprising a schematic representation of a portion of a microcomputer which operates according to a computer program produced according to the flow chart.

Referring now more particularly to FIG. 2, there is represented a flow chart for the microcomputer 10. The microcomputer 10 is programmed in accordance with the FIG. 2 flow chart. The microcomputer 10 has a "power on" microprocessor portion 23 and an "initialization and read control parameters" microprocessor portion 24. The "initialization and read control parameters" microprocessor portion 24 determines values for parameters such as melt on time, melt off time, minimum on time, proportional band and normal temperature, setpoint temperature, offset temperature, melt limit temperature, cold start flag, rise flag, fall flag, fast flag, and slow flag which are status flags more fully explained hereinafter.

The microprocessor portion 24 is coupled to a "is probe open?" microprocessor portion 25. The microprocessor portion 25 is responsive to a "probe temperature signal" microprocessor portion 26. If the probe is open, the "yes" output of the microprocessor portion 25 actuates a "heat off" microprocessor portion 26a which switches the heating elements off. If the probe is not open the "no" output of the microprocessor portion 25 actuates an "is probe short-circuited?" microprocessor portion 27. If the probe is short-circuited, the "yes" output of the microprocessor portion 27 actuates the "heat off" microprocessor portion 26a. The "yes" outputs of the microprocessor portions 25 and 27 also actuate the "disengage control transfer relay" microprocessor portion 28 which switches the temperature control to a backup thermostat of the cooking apparatus, as is more fully described and claimed in copending application Ser. No. 934,700 filed Nov. 25, 1986. If the probe is not short-circuited the "no" output of the microprocessor portion 27 is coupled to the "is melt cycle active?" microprocessor portion 29. The "initialization and read control parameters" microprocessor portion 24 is also coupled to the microprocessor portion 29 to apply the melt cycle flag thereto if the melt cycle is active. If the melt cycle is not active, the "no" output of the microprocessor portion 29 is applied to the "is cold start flag set?" microprocessor portion 30.

The "yes" output of the microprocessor portion 29 is coupled to an "is actual probe temperature less than melt limit temperature?" microprocessor portion 31. A "probe temperature signal" microprocessor portion 27a is also coupled to an input of the microprocessor portion 31.

If the actual probe temperature is less than the melt limit temperature, the "yes" output of the microprocessor portion 31 is coupled to a "heat off" microprocessor portion 32. The output of the microprocessor portion 32 is coupled to a "melt off time" microprocessor portion 33 for controlling the time period that the heat is off. The output of the microprocessor portion 33 is coupled to a "heat on" microprocessor portion 34 having its output coupled to a "melt on time" microprocessor portion 35 for controlling the time period the heat is on. The output of the microprocessor portion 35 is coupled to an input of the microprocessor portion 31 so that the heat is switched on and off until the actual probe temperature is equal to or greater than the melt limit temperature. The "no" output of the microprocessor portion 31 is coupled to an input of the "is cold start flag set?" microprocessor portion 30.

If the cold start flag is set, the cooking apparatus is in start-up mode. The "yes" output of the microprocessor portion 30 is coupled to a "change proportioning band to start-up band" microprocessor portion 32. The proportioning band is a temperature band of, for example, 25° F. less than a predetermined setpoint temperature, for example, 350° F. The start-up band is a temperature band of, for example, 35° F. less than the setpoint temperature extending to the setpoint temperature. The normal temperature is defined as the setpoint temperature minus the proportioning band during idle mode or the setpoint temperature minus the start-up band during start-up mode. The melt cycle reference temperature or melt limit temperature is, for example, typically 135° F. to 180° F.

The output of the microprocessor portion 32 is coupled to an input of an "is temperature above normal temperature?" microprocessor portion 33. The "no" output of the microprocessor portion 33 is coupled to a "heat on" microprocessor portion 34 which switches the heating elements on. The output of the microprocessor portion 34 is coupled to the input of the microprocessor portion 33 so that the heat remains on until the actual temperature is above the normal temperature. The microprocessor portion 33 then applies a "yes" output to a "clear cold start flag" microprocessor portion 35.

The "no" output of the "is cold start flag set?" microprocessor portion 30 is coupled to the "is temperature above normal temperature?" microprocessor portion 33. The microprocessor portion 35 can clear the cold start flag in response to a signal from the microprocessor portion 30 to the microprocessor portion 33 and to the "yes" output of the microprocessor portion 33.

Figure 3:
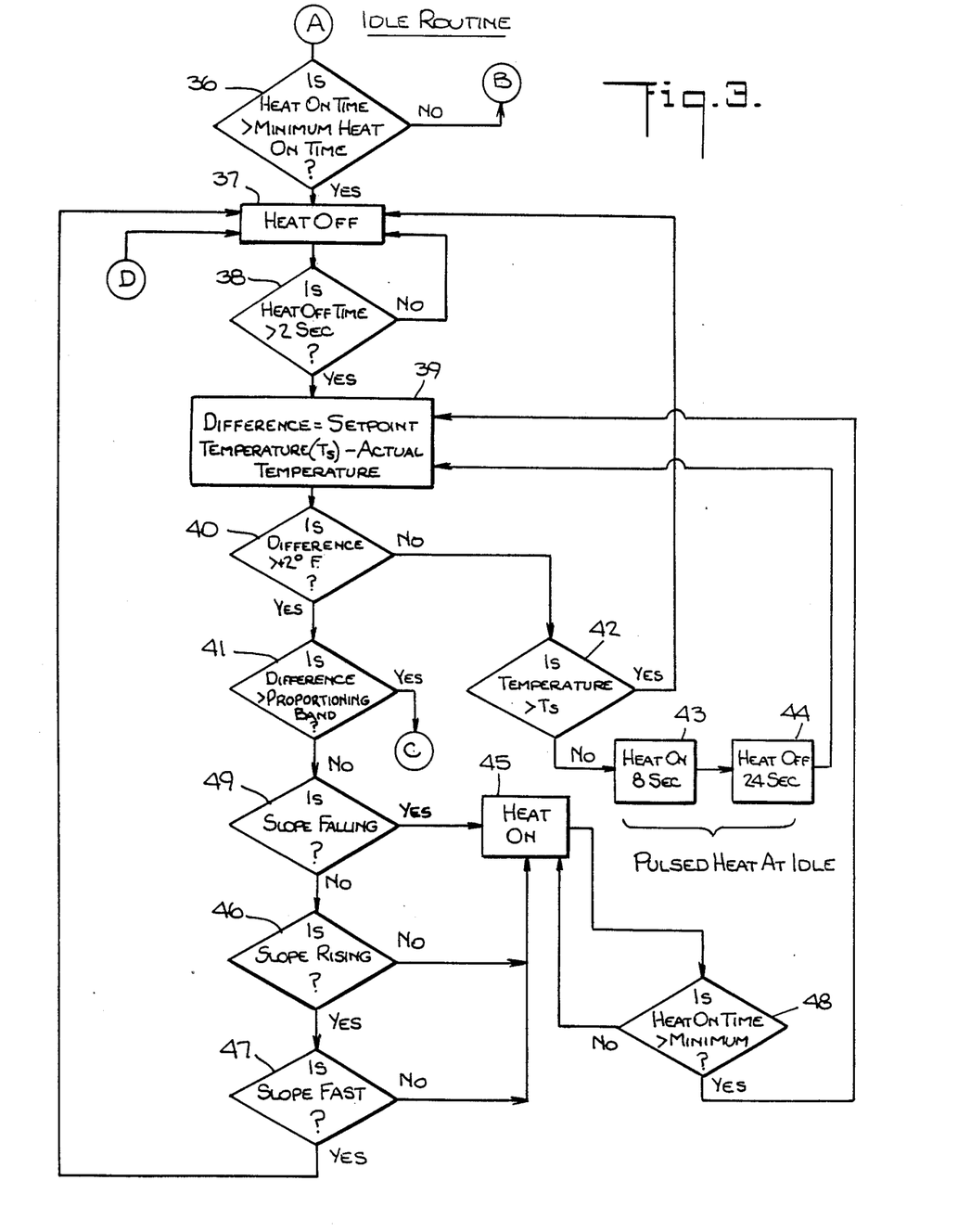
FIG. 3 is a flow chart comprising a schematic representation of a portion of a microcomputer which operates in an idle routine according to a computer program produced according to the flow chart.

FIG. 3 represents the idle routine of the temperature control system. The output of the "clear cold start flag" microprocessor portion 35 is coupled to an "is heat on time greater than minimum heat on time?" microprocessor portion 36. The "no" output of the microprocessor portion 36 is coupled to the input of the microprocessor portion 33 to cause another temperature reading maintaining the heat on while the temperature is above the normal temperature and until the heat on time is greater than the minimum heat on time. The minimum heat on time prevents the heat on from short cycling which would be disadvantageous because combustion might not occur.

The "yes" output of the microprocessor portion 36 is coupled to a "heat off" microprocessor portion 37 having its output coupled to an "is heat off time greater than 2 seconds?" microprocessor portion 38. The "no"

output of the microprocessor portion 38 is coupled to the "heat off" microprocessor portion 37 to insure a minimum delay before the heat is switched on again since if the heat switched on in a shorter time than the minimum delay, this would be disadvantageous because rapid cycling of burner on valve would occur.

The "yes" output of the microprocessor portion 38 is coupled to a "difference equals setpoint temperature ($T_s$) minus actual temperature" microprocessor portion 39 which determines the difference between the actual temperature and the setpoint temperature.

The output of the microprocessor portion 39 is coupled to, for example, an "is difference greater than $+2°$ F.?" microprocessor portion 40.

If the difference is greater than, for example, $+2°$ F., the microprocessor portion 40 applies a "yes" signal to an "is difference greater than proportioning band" microprocessor portion 41.

If the difference between the actual temperature and the normal temperature is greater than the proportioning band, the microprocessor portion 41 applies a "yes" output to the "heat on" microprocessor portion 34 to switch the heat on.

The "no" output of the microprocessor portion 40 is also coupled to an "is temperature greater than setpoint temperature ($T_s$)?" microprocessor portion 42 so that if the difference between the setpoint temperature ($T_s$) and the actual temperature is not greater than, for example, $2°$ F. a signal is applied to microprocessor portion 42. If the actual temperature is not greater than the setpoint temperature ($T_s$), the "no" output of the microprocessor portion 42 is applied to, for example, a "heat on 8 seconds" microprocessor portion 43. The output of the microprocessor portion 43 is applied to a, for example, "heat off 24 seconds" microprocessor portion 44 which has an output coupled to the microprocessor portion 39 for causing a difference measurement to be made by the microprocessor portion 44 when the difference between the setpoint temperature ($T_s$) and the actual temperature is not greater than, for example, $+2°$ F. Thus, when the setpoint temperature is not more than, for example, typically $2°$ F. greater than the actual temperature, the idle routine results in pulsed heat with a predetermined duty cycle.

If the microprocessor portion 42 determines that the temperature is greater than the setpoint temperature ($T_s$), a "yes" output of the microprocessor portion 42 is applied to the heat off microprocessor portion 37 to switch the heat off under that operating condition.

The "yes" output of the "is difference greater than proportioning band?" microprocessor portion 41 is coupled to the "heat on" microprocessor portion 34 to continue the heating of the cooking medium. The "no" output of the microprocessor portion 41 is coupled to an "is slope falling?" microprocessor portion 49. The microprocessor portion 49 reads the status flags of FIG. 6 which are rise, fall, fast, and slow flags set at, for example, either a zero or one binary bit value in accordance with a slope detection system described subsequently.

If the microprocessor portion 49 reads that the temperature slope is falling, the "yes" output of the microprocessor portion 49 is applied to a "heat on" microprocessor portion 45 which interrupts the proportioning or pulsed heat at idle mode and is coupled to the input of an "is heat on time greater than minimum?" microprocessor portion 48. The "no" output of microprocessor portion 48 is coupled to the input of the "heat on" microprocessor portion 45. The "yes" output of the microprocessor portion 48 is coupled to microprocessor portion 39 for causing a difference measurement to be made when the heat on time is greater than the minimum.

The "no" output of the "is slope falling?" microprocessor portion 49 is applied to an "is slope rising?" microprocessor portion 46. The "no" output of the microprocessor portion 46, indicating that the temperature is remaining the same, is applied to the "heat on" microprocessor portion 45 which interrupts the proportioning or pulsed heat at idle mode. The "yes" output of the microprocessor portion 46 is applied to an "is slope fast?" microprocessor portion 47 which also reads the status flags of FIG. 6. The "no" output of the microprocessor portion 47, indicating that the temperature is not rising fast, is coupled to the "heat on" microprocessor portion 45 which switches the heat on and interrupts the proportioning or pulsed heat at idle mode.

It is desired that the temperature of the cooking medium rises fast during idle mode and the "yes" output of the microprocessor portion 47 is coupled to the "heat off" microprocessor portion 37 which switches the heating element off allowing the temperature of the cooking medium to coast upwardly.

Figure 4:
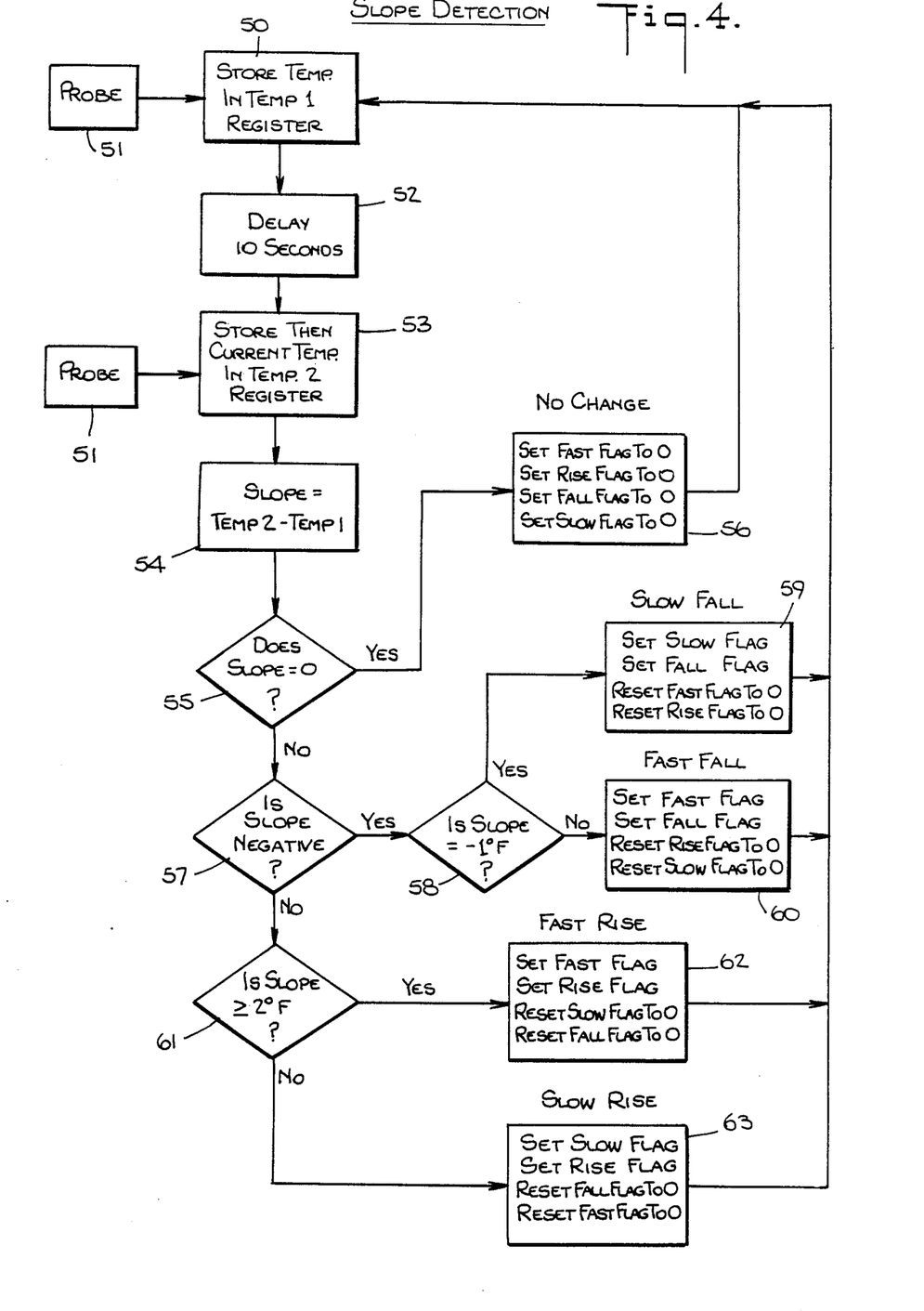
FIG. 4 is a flow chart comprising a schematic representation of a portion of a microcomputer which operates during idle routine according to a computer program produced according to the flow chart.
Figure 6:
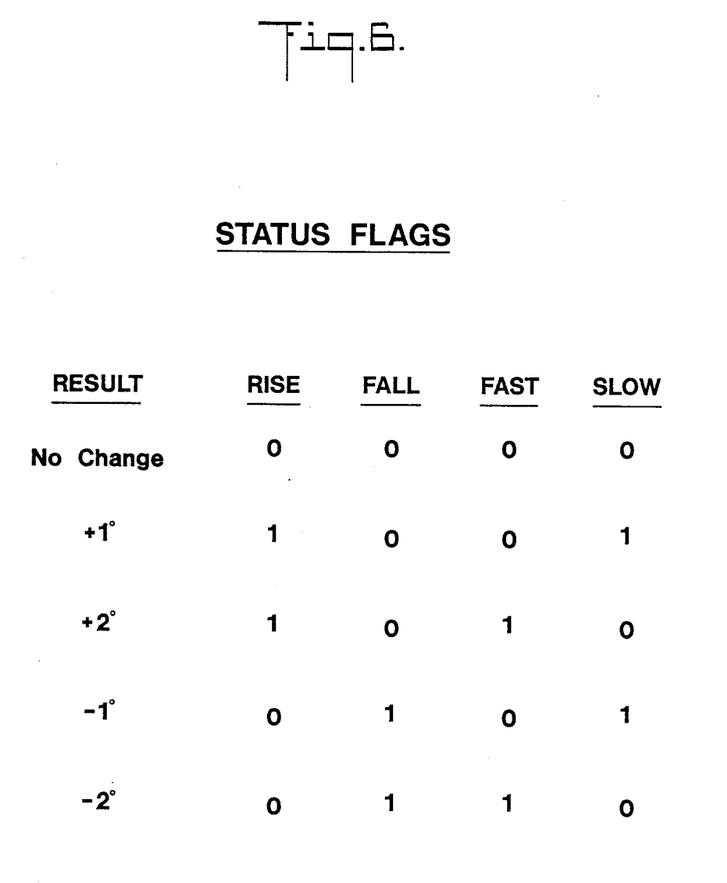
FIG. 6 is a chart representing various status flags during different operating conditions of the temperature control system.

Referring now more particularly to FIG. 4, there is represented a flow chart representing microprocessor portions for accomplishing temperature slope detection during idle mode repeated, for example, every ten seconds under the control of a suitable clock, not shown. The "probe temperature signal" 51 is coupled to the input of a "store temperature in temperature 1 register" microprocessor portion 50. The output of the "store temperature in temperature 1 register" 50 is coupled to a, for example, "delay 10 seconds" microprocessor portion 52 which in turn is coupled to a "store then current temperature 2 in temperature 2 register" 53 also having an input coupled to the "probe temperature signal" 51. The output of the microprocessor register 50 and the output of the microprocessor register 53 are coupled to a "slope equals temperature 2 minus temperature 1" microprocessor portion 54. Thus, the slope is represented by a temperature comparison made with, for example, a ten second delay. The output of the microprocessor portion 54 is coupled to an "does slope equals zero" microprocessor portion 55. The "yes" output of the microprocessor portion 55, indicating no change in temperature, is coupled to a "set fast flag to zero," "set rise flag to zero," "set fall flag to zero" and "set slow flag to zero" "no change" microprocessor portion 56. This condition is represented in the chart of FIG. 6 with the "result" indicating "no change" and the rise, fall, fast and slow flags all set to zero. The output of the microprocessor portion 56 is coupled to the microprocessor portion or register 50 to actuate the register 50 to read the temperature probe again and to cause the microcomputer to make a new calculation. The second reading of the probe and storage in register 50 is accomplished under the control of a clock microprocessor portion (not shown) and is repeated, for example, every ten seconds.

The "no" output of the microprocessor portion 55 is coupled to a, for example, "is slope negative?" microprocessor portion 57. The "yes" output of the microprocessor portion 57 is coupled to a, for example, "is slope equal $-1°$ F.?" microprocessor portion 58. The "yes" output of the microprocessor portion 58 is coupled to a "slow fall" microprocessor portion 59 which includes a "set slow flag to 1," "set fall flag to 1," "re-set fast flag to 0," and "re-set rise flag to 0" microprocessor portions. The output of the microprocessor portion 59 is coupled to the microprocessor portion 50.

The "no" output of the "is slope equal −1° F.?" microprocessor portion 58 is coupled to a "fast fall" microprocessor portion 60 which sets the fast flag to 1, the fall flag to 1 and re-sets the rise flag to 0 and re-sets the slow flag to 0 as indicated in the chart of FIG. 6. The output of the microprocessor portion 60 is coupled to the input of the register 50.

The "no" output of the microprocessor portion 57 is coupled to an "is slope greater than or equal to 2° F.?" microprocessor portion 61. The "yes" output of the microprocessor portion 61 is coupled to a "fast rise" microprocessor portion 62 which sets the fast flag to 1, sets the rise flag to 1, re-sets the slow flag to 0 and re-sets the fall flag to 0 as indicated by the chart of FIG. 6. The output of the microprocessor portion 62 is coupled to the register 50.

The "no" output of the microprocessor portion 61 is coupled to the "slow rise" microprocessor portion 63 which sets the slow flag to 1, sets the rise flag to 1, re-sets the fall flag to 0, and re-sets the fast flag to 0. The output of the microprocessor portion 63 is coupled to the register 50.

Figure 5:
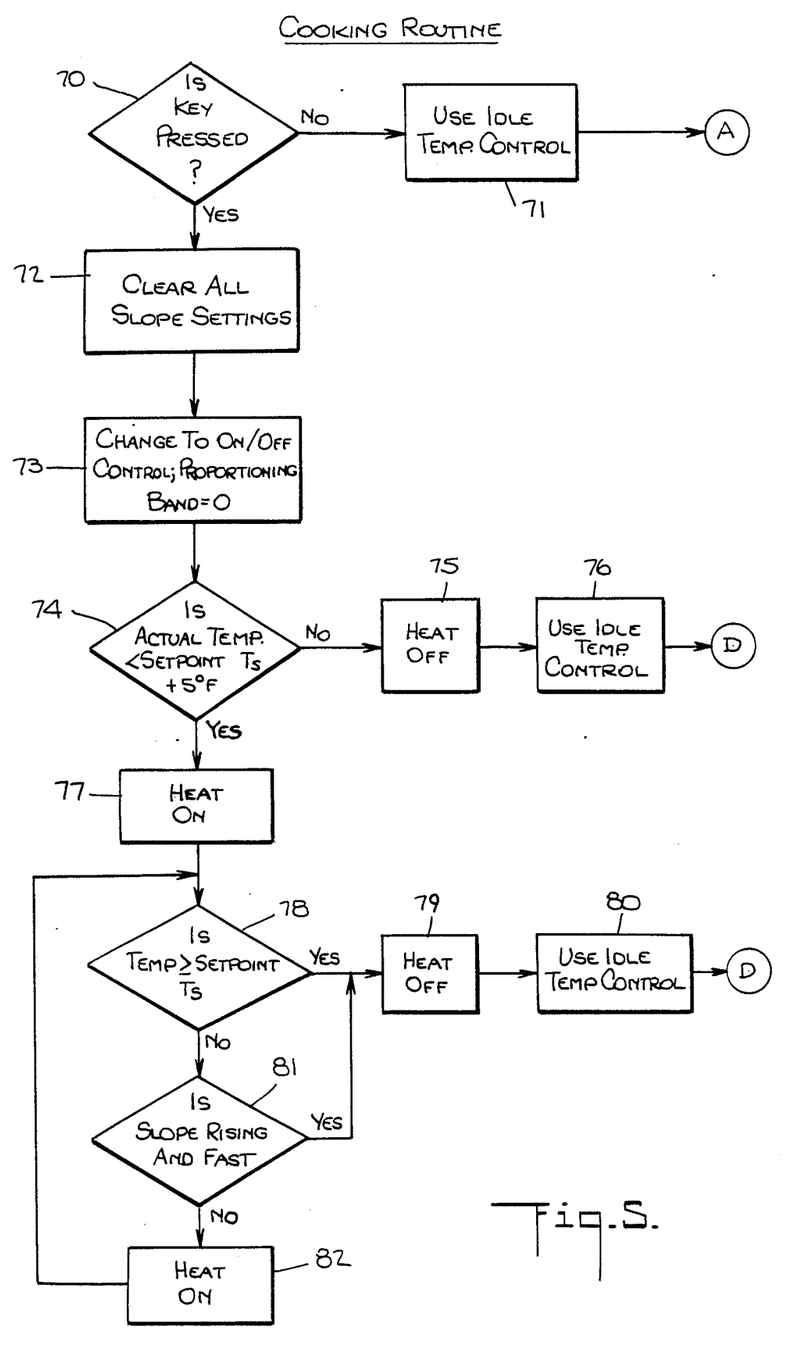
FIG. 5 is a flow chart comprising a schematic representation of a portion of a microcomputer which operates during cooking routine according to a computer program produced according to the flow chart.

Referring now more particularly to FIG. 5, the flow chart represents a microcomputer programmed for a cooking routine. For example, an "is key pressed" microprocessor portion 70 determines whether a product key has been pressed by an operator to initiate a cooking routine. The "no" output of the microprocessor portion 70 is coupled to a "use proportioning or idle temperature control" microprocessor portion 71 which is coupled to the input of the microprocessor portion 36 utilized in the idle routine. The "yes" output of the microprocessor portion 70 is coupled to a "clear all slope settings" microprocessor portion 71 which is coupled to the "store temperature in temperature 1 register" 50 and "store the then current temperature 2 in temperature 2" register 53 to cause the microprocessor portion 55 to determine that the slope equals 0, setting the fast flag to 0, the rise flag to 0, the fall flag to 0 and the slow flag to 0. The slope detection microprocessor portions of FIG. 4 then make fresh measurements of the probe temperature for determining the proper settings of the fast, rise, fall and slow flags immediately.

The microprocessor portion 72 is coupled to a "change to on/off control; proportioning band equals 0" microprocessor portion 73. The microprocessor portion 73 causes the normal temperature to be equal to the setpoint temperature.

The microprocessor portion 73 is coupled to an "is actual temperature less than setpoint temperature (T$_s$) +5° F.?" microprocessor portion 74. The setpoint temperature +5° F. includes, for example, a 5° F. offset increment to take into account that the temperature of the cooking medium is higher at the edge of the cooking apparatus where the temperature probe is likely to be positioned than at the center of the cooking medium where the setpoint temperature is desired for cooking. This offset increment may in some apparatus be a negative increment or zero and may be programmable by an operator or may be a variable temperature parameter determined by the temperature control system.

The "no" output of the microprocessor portion 74 is coupled to a "heat off" microprocessor portion 75 to switch the heat off. The "heat off" microprocessor portion 75 is coupled to a "use idle control" microprocessor portion 76 which includes means for re-setting the proportioning band and the normal temperature to the values used during the idle routine. The microprocessor portion 76 is coupled to the input of the microprocessor portion 37 used in the idle routine.

The "yes" output of the microprocessor portion 74 is coupled to a "heat on" microprocessor portion 77 which switches the heat on and is coupled to an "is temperature greater than or equal to setpoint temperature (T$_s$)?" microprocessor portion 78.

The "yes" output of the microprocessor portion 78 is coupled to a "heat off" microprocessor portion 79 which switches the heat off and is coupled to a "use idle temperature control" microprocessor portion 80 which includes means for re-setting the normal temperature and the proportioning band to the value used during the idle routine. Thus, the heat remains on during cooking until the setpoint temperature is reached or until the temperature slope is rising fast as will now be explained.

The "no" output of the microprocessor portion 78 is coupled to an "is slope rising fast?" microprocessor portion 81 which reads the status flags as they were set after being cleared by the microprocessor portion 72. The "yes" output of the microprocessor portion 81 is coupled to the "heat off" microprocessor portion 79. This limits the amounts and the occurrences of overshoot even during the cooking cycle.

The "no" output of the microprocessor portion 81 is coupled to a "heat on" microprocessor portion 82 which switches the heat on and is coupled to the microprocessor portion 78.

From the foregoing description, it will be apparent that a temperature control system in accordance with the invention uses both on/off control and proportioning band control. The system selects the proper control based on the actual present response in the system, thus adapting to the actual operating mode and temperature of the cooking apparatus. The temperature control system actually chooses the type of control as it is controlling temperature rather than an individual's selecting a particular type of control when he selects the temperature control system. Thus the temperature control system in accordance with the invention is dynamic, changing modes automatically as the cooking apparatus operates.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A temperature control system for cooking apparatus having a cooking mode and a second mode of operation comprising:
   first means for heating a cooking medium;
   second means for sensing the actual temperature of the cooking medium;
   third means for determining whether the cooking apparatus is in a cooking mode or a second non-cooking mode of operation; and
   fourth means responsive to said mode-determining means and to said sensing means for using on/off control during at least a portion of the cooking mode if the cooking apparatus is in the cooking mode and for using proportional band control if the cooking apparatus is in a second non-cooking mode, said heating means being responsive to said fourth means.

2. A temperature control system for cooking apparatus having different modes of operation comprising:
first means for heating a cooking medium;
second means for sensing the actual temperature of the cooking medium;
third means for determining whether the apparatus is in a start-up mode or in idle mode of operation; and
fourth means responsive to said mode-determining means for determining a normal operating temperature when the apparatus is in said start-up mode and for determining an actual temperature of the cooking medium when the apparatus is in said idle mode, said heating means being responsive to said fourth means.

3. A temperature control system for cooking apparatus having different modes of operation comprising;
means for heating a cooking medium;
means for sensing the actual temperature of the cooking medium;
means for determining whether the apparatus is in a start-up mode;
means responsive to said sensing means for determining whether the actual temperature is above a predetermined normal operating temperature;
means responsive to said means for determining whether the actual temperature is above said predetermined normal temperature for switching said heating means on when said actual temperature is not above said normal temperature in said start-up mode; and
means responsive to said means for determining whether the actual temperature is above said predetermined normal temperature for redetermining said normal temperature at a higher predetermined temperature when said actual temperature is above said normal temperature in said start-up mode.

4. A temperature control system for cooking apparatus having different modes of operation comprising:
first means for heating a cooking medium;
second means for sensing the actual temperature of the cooking medium;
third means for determining whether the cooking apparatus is in a cooking mode or a non-cooking mode for determining a proportional band temperature parameter at a valve when the apparatus in said cooking mode and for determining said proportional hand temperature parameter at a different value when the apparatus is in a non-cooking mode, and
fourth means for determining an actual temperature of the cooking medium when the apparatus is in said cooking mode, said heating means being responsive to said fourth means.

5. Apparatus in accordance with claim 4 which includes means responsive to the rate of change of said actual temperature of the cooking medium for controlling said means for determining said actual temperature of the cooking medium.

6. A temperature control system for cooking apparatus comprising:
means for heating a cooking medium;
means for sensing the actual temperature of the cooking medium;
means responsive to said sensing means for determining whether the actual operating temperature is above a predetermined normal temperature;
means responsive to said sensing means and to said means for determining whether the actual temperature is above a predetermined normal operating temperature for comparing the actual temperature sensed by said sensing means with a predetermined setpoint temperature when the actual temperature is above said predetermined normal temperature; and
means responsive to said comparing means for switching said heating means on and off with different duty cycles varying in accordance with the difference between said setpoint temperature and said actual temperature;
said means for switching said heating means on and off comprising means responsive to said comparing means for determining whether the difference between said setpoint temperature and said actual temperature is greater than the difference between said setpoint temperature and said predetermined normal temperature for comparing the actual temperatures at two different times to determine whether said actual temperature has remained the same, has risen or has fallen.

7. A system in accordance with claim 6 in which said means for switching said heating means on and off includes means for determining whether said actual temperature is rising fast.

8. A system in accordance with claim 7 which includes means for setting a rise flag, means for setting a fall flag, means for setting a fast flag and means for setting a slow flag.

9. A system in accordance with claim 8 in which said means for switching said heating means on and off includes means for switching said heating means on unless the actual temperature is rising fast and includes means for switching said heating means off if the actual temperature is rising fast.

10. A temperature control system for cooking apparatus having different modes of operation including start-up, idle and cooking modes comprising:
means for heating a cooking medium;
means for sensing the actual temperature of the cooking medium;
means for determining whether the apparatus is in start-up mode;
means responsive to said start-up-mode-determining means for determining a normal operating temperature at a lower temperature in start-up mode than when in idle mode;
means responsive to said sensing means for determining whether the actual temperature is above a predetermined normal operating temperature; and
means responsive to said sensing means and to said means for determining whether the actual temperature is above said predetermined normal temperature for comparing the actual temperature sensed by said sensing means with a predetermined setpoint temperature when the actual temperature is above said predetermined normal temperature when in idle mode;
means responsive to said sensing means and to said means for determining whether the actual temperature is above said predetermined normal temperature for switching said heat on when said actual temperature is not above said normal temperature in start-up mode;
means for re-determining said normal temperature at a higher predetermined temperature when said actual temperature is above said normal temperature in start-up mode;

and means for switching said heating means on and off with different duty cycles varying in accordance with the difference between said setpoint temperature and said actual temperature.

11. A temperature control system for cooking apparatus having different modes of operation including start-up, idle and cooking modes comprising:

means for heating a cooking medium;

means for sensing the actual temperature of the cooking medium;

means for determining when the apparatus is in cooking mode;

means responsive to said cooking-mode-determining means for changing a normal temperature to be equal to a predetermined setpoint temperature;

means responsive to said normal-temperature-changing means for determining whether said actual temperature is less than said setpoint temperature plus a predetermined offset temperature;

means responsive to said means for determining whether said actual temperature is less than said setpoint temperature plus a predetermined offset temperature for switching said heating means on when said actual temperature is less than said setpoint temperature plus said predetermined offset temperature.

12. A system in accordance with claim 11 which includes means for determining whether said actual temperature is greater than or equal to said setpoint temperature and which includes means for determining whether said actual temperature is rising fast for maintaining said heating means on if said actual temperature is not rising fast.

13. A system in accordance with claim 12 in which said means for determining whether said actual temperature is rising fast switches said heating means off if said actual temperature is rising fast.

* * * * *

UNITED STATES PATENT AND TRADEMARK OFFICE
CERTIFICATE OF CORRECTION

PATENT NO. : 4,812,625

DATED : March 14, 1989

INVENTOR(S) : Mario G. Ceste, Sr.

It is certified that error appears in the above-identified patent and that said Letters Patent is hereby corrected as shown below:

Claim 4, column 11, line 47, after "apparatus" insert --is--

Claim 4, column 11, line 49, for "hand" read --band--

Signed and Sealed this

Seventh Day of May, 1991

*Attest:*

HARRY F. MANBECK, JR.

*Attesting Officer*    *Commissioner of Patents and Trademarks*